(12) United States Patent
Kohli

(10) Patent No.: US 6,519,585 B1
(45) Date of Patent: Feb. 11, 2003

(54) SYSTEM AND METHOD FOR FACILITATING PRESENTATION OF SUBJECT CATEGORIZATIONS FOR USE IN AN ON-LINE SEARCH QUERY ENGINE

(75) Inventor: Sanjay Kohli, Redmond, WA (US)

(73) Assignee: Infospace, Inc., Bellevue, WA (US)

( * ) Notice: Subject to any disclaimer, the term of this patent is extended or adjusted under 35 U.S.C. 154(b) by 0 days.

(21) Appl. No.: 09/300,336

(22) Filed: Apr. 27, 1999

(51) Int. Cl.[7] .............................................. G06F 17/30
(52) U.S. Cl. .............................................. 707/3; 707/5
(58) Field of Search ............................... 707/3, 5, 4, 6, 707/10, 101, 102, 526

(56) References Cited

U.S. PATENT DOCUMENTS

| | | | | |
|---|---|---|---|---|
| 5,640,553 A | * | 6/1997 | Schultz ........................... | 707/5 |
| 5,717,914 A | * | 2/1998 | Husick et al. ............... | 345/440 |
| 6,289,353 B1 | * | 9/2001 | Hazlehurst et al. ......... | 707/101 |
| 6,314,420 B1 | * | 11/2001 | Lang et al. .................... | 707/10 |
| 6,327,590 B1 | * | 12/2001 | Chidlovskii et al. ........... | 707/5 |
| 6,393,415 B1 | * | 5/2002 | Getchius et al. ............... | 707/2 |
| 6,397,228 B1 | * | 5/2002 | Lamburt et al. ............ | 200/201 |

\* cited by examiner

*Primary Examiner*—Sanjiv Shah

(57) ABSTRACT

A system method for facilitating presentation of subject categorizations for use in an on-line search query engine is described. A synonym list is built including a set of synonym entries. Each synonym entry includes a synonym name and a heading code. The synonym list is arranged in order of synonym name. A search query is accepted from a user on the on-line search query engine. The search query is normalized into a standardized word form with at least one word in the standardized word form matching one of the synonym names in the synonym list. Each of the synonym entries in the synonym list having at least one synonym name matching the at least one word in the standardized word form is retrieved. A heading list including a set of heading entries is accessed. Each heading entry includes a heading name and a heading code. The heading list is arranged in order of heading code. Subject categorizations are presented as the heading names from each entry in the heading list having a heading code matching one of the heading codes in each of the retrieved synonym list entries.

54 Claims, 17 Drawing Sheets

OUR SERVICES:  Home | White Pages | Classifieds | Shopping | City Guide | Finance | Community | News Break

[InfoSpace LOGO]

ADVERTISEMENT
Click Here for Advertisement

OUR SPONSORS:
- 1-800-U.S.SEARCH! • HomeAdvisor • Expedia Travel • PC & Mac Zone • Buyer's Club
- Women.Com • Ship a package • GiftTree YOU ARE HERE > Home > Yellow Pages > Business by Category > Directory

Directory

Businesses in Seattle, WA
Seattle, WA: Business Directory
Search Near Address | New City
Type a category or business name and press Find:
⦿ Category (e.g., coffee)  ◯ Name (e.g., Starbucks)
[ physician ] [ Find ]
  ↑34
Or choose one of these main categories:

- Automotive...
- Business Services...
- Computers & Electronics...
- Entertainment...
- Family & Lifestyles...
- Finance, Legal & Insurance...

- Food & Dining...
- Home Improvement...
- Medical...
- Real Estate...
- Retail & Community...
- Travel...

Professional Guide
Attorneys, Physicians, Accountants...
All Categories: A B C D E F G H I J K L M N O P Q R S T U V W X Y Z Print Affiliate
BananaPages ADVERTISEMENT
Click Here for Advertisement
Frequently Asked Questions | Contact InfoSpace.com

[InfoSpace LOGO]

| OUR SERVICES: | Home | White Pages | Classifieds | Shopping | City Guide | Finance | Community | News Break |

ADVERTISEMENT

Click Here for Advertisement

OUR SPONSORS: • 1-800-U.S.SEARCH! • HomeAdvisor • Expedia Travel • PC & Mac Zone • Buyer's Club • Women.Com • Ship a package • GiftTree YOU ARE HERE > Home > Yellow Pages > Business by Category > Directory > Categories

Categories  *32*

Seattle, WA: physcian
Choose a category related to "physcian":

36 {
- Anesthetists
- Chiropractic Clinics
- Chiropractic Doctor Info Bureaus
- Chiropractors Dc
- Clinics
- Health Services
- Homeopaths
- Hospitals
- Medical Equipment-Repairing
- Offices & Clinics Of Doctors-Osteopathy
- Ophthalmologists
- Optometrists Od
- Physician & Surgeon Recruitment
}

- Physicians & Surgeons... BY BRAND/SPECIALTY
- Physicians & Surgeons Equip & Supls-Mfrs
- Physicians & Surgeons Equip & Supls-Wholesale
- Physicians & Surgeons Information Bureau
- Physicians Assistants
- Physicians-Naturopathic
- Physicians/Surgeons Equip-Spec Designed
- Podiatrists
- Podiatrists Information Bureaus
- Psychiatry-Adult Child & Adolescent
- Scales-Manufacturers
- Scales-Repairing
- Telephone Answering Service Print Affiliate
BananaPages

*35*

Related Links

Advertisement

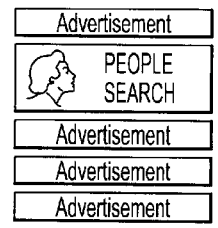

PEOPLE SEARCH

Advertisement

Advertisement

Advertisement

Seattle
- City Guide
- Classifieds
- Weather

Washington
- Travel Guide
- SlideShow

More Searches
- Yellow Pages Index
- Search Near Address
- Companies Online
- Fax Numbers
- Toll-Free Numbers
- Maps & Directions
- e-Shopping

ADVERTISEMENT

Click Here for Advertisement
Frequently Asked Questions | Contact InfoSpace.com

*Fig. 2B*

| OUR SERVICES: | Home | White Pages | Classifieds | Shopping | City Guide | Finance | Community | News Break |

| InfoSpace LOGO | ADVERTISEMENT |

Click Here for Advertisement

OUR SPONSORS: • 1-800-U.S.SEARCH! • HomeAdvisor • Expedia Travel • PC & Mac Zone • Buyer's Club
• Women.Com • Ship a package • Start Holiday Shopping • GiftTree YOU ARE HERE > Home > Yellow Pages > Business by Category > Directory > Categories

Categories  *42*

Seattle, WA: plumbing contractors
Choose a category related to "plumbing contactors":

46
- Dry Well Contractors
- Pipe Cleaning
- Pipe Thawing

- Plumbing Contractors
- Plumbing Heating & Air Conditioning

Print Affiliate
BananaPages

*45*

Related Links

Advertisement

PEOPLE SEARCH

Advertisement

Advertisement

Advertisement

Seattle
- City Guide
- Classifieds
- Weather

Washington
- Travel Guilde
- SlideShow

More Searches
- Yellow Pages Index
- Search Near Address
- Companies Online
- Fax Numbers
- Toll-Free Numbers
- Maps & Directions
- e-Shopping

*Fig. 3B*

OUR SERVICES: Home | White Pages | Classifieds | Shopping | City Guide | Finance | Community | News Break InfoSpace LOGO ADVERTISEMENT
Click Here for Advertisement OUR SPONSORS: • 1-800-U.S.SEARCH! • HomeAdvisor • Expedia Travel • PC & Mac Zone • Buyer's Club
• Women.Com • Ship a package • Start Holiday Shopping • GiftTree YOU ARE HERE > Home > Yellow Pages > Business by Category > Directory

Directory
Businesses in Seattle, WA
Seattle, WA: Business Directory
Search Near Address | New City
Type a category or business name and press Find:
○ Category (e.g., coffee)  ● Name (e.g., Starbucks)
[ Hertz ]   Find

53 — 51
52 — 54

Or choose one of these main categories:
- Automotive...
- Business Services...
- Computers & Electronics...
- Entertainment...
- Family & Lifestyles...
- Finance, Legal & Insurance...
- Food & Dining...
- Home Improvement...
- Medical...
- Real Estate...
- Retail & Community...
- Travel...

Professional Guide
Attorneys, Physicians, Accountants...
All Categories: A B C D E F G H I J K L M N O P Q R S T U V W X Y Z Print Affiliate
BananaPages

50

InfoSpace LOGO

ADVERTISEMENT
Click Here for Advertisement
Frequently Asked Questions | Contact InfoSpace.com

*Fig. 4A*

| OUR SERVICES: | Home | White Pages | Classifieds | Shopping | City Guide | Finance | Community | News Break |

InfoSpace LOGO

ADVERTISEMENT

Click Here for Advertisement

OUR SPONSORS: • 1-800-U.S.SEARCH! • HomeAdvisor • Expedia Travel • PC & Mac Zone • Buyer's Club
• Women.Com • Ship a package • Start Holiday Shopping • GiftTree YOU ARE HERE > Home > Yellow Pages > Business by Category > Directory > Listings

Listings /—52

Seattle, WA: Hertz
Results 1-11 of 11

All Listings
Automobile Dealers-Used Cars   Show All
Hertz Car Sales                                            206-439-1011
18625 Des Moines Memorial Dr.          [About...]    [Info]
Seattle, WA 98148-1921         Map/Directions-Profile   More Info
Automobile Renting & Leasing   Show All
Hertz                                                      206-439-8226
18634 Des Moines Memorial Dr.          [About...]    [Info]
Seattle, WA 98148-1922         Map/Directions-Profile   More Info
Hertz Rent A Car                                           206-682-5050
722 Pike St                            [About...]    [Info]
Seattle, WA 98101-2311         Map/Directions-Profile   More Info
Hertz Rent A Car                                           206-433-5275
3201 S 176th St                        [About...]    [Info]
Seattle, WA 98188-4013         Map/Directions-Profile   More Info
Hertz (Automobile Renting & Leasing)   Show All
Hertz Rent A Car                                           206-682-5050
722 Pike St                            [About...]    [Info]
Seattle, WA 98101-2311         Map/Directions-Profile   More Info
Hertz Rent A Car                                           206-433-5275
3201 S 176th St                        [About...]    [Info]
Seattle, WA 98188-4013         Map/Directions-Profile   More Info
Contractors-Equip/Supls-Dlrs/Service (Wholesale)   Show All
Hertz Equipment Rental                                     206-241-9255
12900 48th Ave S                       [About...]    [Info]
Seattle, WA 98168-3300         Map/Directions-Profile   More Info
Contractors-Equipment & Supls-Renting   Show All
Hertz Equipment Rental                                     206-241-9255
12900 48th Ave S                       [About...]    [Info]
Seattle, WA 98168-3300         Map/Directions-Profile   More Info Related Links
[ Advertisement ]

PEOPLE SEARCH

[ Advertisement ]
[ Advertisement ]
[ Advertisement ]

Seattle
• City Guide
• Classifieds
• Weather

Washington
• Travel Guide
• SlideShow

More Searches
• Yellow Pages Index
• Search Near Address
• Companies Online
• Fax Numbers
• Toll-Free Numbers
• Maps & Directions
• e-Shopping

Moving Supplies & Equipment-Renting  Show All
Hertz Penske Truck Rental                              206-622-3674
3453 4th Ave S                    [About...]           [Info]
Seattle, WA 98134-1904            Map/Directions-Profile   More Info
Rental Service-Stores & Yards  Show All
Hertz Equipment Rental                                 206-241-9255
12900 48th Ave S                  [About...]           [Info]
Seattle, WA 98168-3300            Map/Directions-Profile   More Info
Truck Renting & Leasing  Show All
Hertz Penske Truck Rental                              206-622-3674
3453 4th Ave S                    [About...]           [Info]
Seattle, WA 98134-1904            Map/Directions-Profile   More Info Results 1-11 of 11

56

| InfoSpace LOGO | ADVERTISEMENT |

Click Here for Advertisement
Frequently Asked Questions | Contact InfoSpace.com

*Fig. 4B-2*

InfoSpace
LOGO

ADVERTISEMENT

Click Here for Advertisement

OUR SPONSORS: • 1-800-U.S.SEARCH! • Women.com • Expedia Travel • PC & Mac Zone • Buyer's Club
• Favorite Catalogs • Communicator 4.5 • Find a Cell Phone • Buy Books • NextCard Visa YOU ARE HERE > Home > Yellow Pages > Business by Category > Directory > Categories

Categories
Seattle, WA: hertz
Choose a category related to "hertz":

- Automobile Renting & Leasing
  ...BY BRAND/SPECIALTY
- Hertz (Automobile Renting & Leasing)

⎱ 66

- Passenger Car Leasing

65

Related Links

| Advertisement |
| Advertisement |
| Advertisement |
| Advertisement |
| Advertisement |
| Advertisement |
| Advertisement |
| Advertisement |

| | |
|---|---|
| 1200 | ATTORNEY |
| 2400 | PHYSICIAN |
| 3600 | DENTIST |

| | |
|---|---|
| CLINIC | 2400 |
| DOCTOR | 2400 |
| HOSPITAL | 2400 |
| PHYSICIAN | 2400 |
| SURGEON | 2400 |

| MEDICAL DOCTORS | A4 | PHYSICIANS & SURGEONS | 6800 |
|---|---|---|---|

| HERTZ | 8200 |
|---|---|
| SONY | 3400 |

| 160 | | |
|---|---|---|
| *161* HEADCODE | *162* INT | |
| *163* HEADNAME | *164* VARCHAR | *165* 100 |
| *166* SYNONYMS | *167* VARCHAR | *168* 2000 |

SYSTEM AND METHOD FOR FACILITATING PRESENTATION OF SUBJECT CATEGORIZATIONS FOR USE IN AN ON-LINE SEARCH QUERY ENGINE

FIELD OF THE INVENTION

The present invention relates in general to Internet Web page service providers and, in particular, to systems and methods for facilitating presentation of subject categorizations for use in an on-line search query engine.

BACKGROUND OF THE INVENTION

The use of the Internet as a communications medium has been met with overwhelming acceptance. In particular, the phenomenon of the World Wide Web (or simply "Web") has been tremendously successful for reaching a wide audience for advertising and information dissemination. A wealth of information is available over the Web and the explosive growth of the Web has resulted in what could be termed an "information overload" condition. Internet service providers (ISPs) have responded to this information explosion by providing on-line search query engines which enable a user to specify an information query and receive back search results which pare down the field of search.

Access to Web pages over the Internet is typically accomplished via a Web browser program. A typical Web browser includes provisions for navigating through a Web site using a graphical user interface for both receiving search queries from users and presenting search query results from search query engines.

One particularly effective format for presenting search query results is a "Yellow Pages" indexed format for listing businesses. To search an on-line Yellow Pages directory, a user enters a search query and obtains subject categorizations relating to the query being searched. One problem with prior art search query engines is that these engines are limited to performing literal word searches. Typically, prior art search query engines are restricted to a limited range of synonyms. Consequently, prior art search query engines often return "Item Not Found" or "Invalid Query" responses.

Further problems arise in the prior art with respect to the structure of Yellow Pages listings either being too rigid or unrelated to the search query itself. Yellow Pages listings are typically a single level deep and provide the addresses and locations of businesses falling within any one of a discrete number of individual categories. Each category is described by a heading. Prior art search engines limit users to the use of key words matching one of these discrete set of search categories and most do not allow search queries based on brand names.

Moreover, prior art search engines often function seemingly independent from the list of available synonyms for any given search query term. The synonyms themselves are too stringently searched based on the structure of the Yellow Pages directory. Consequently, the search query engine may return search results with no relationship to the search query.

Therefore, there is a need for an automatic thesaurus feature for use in an on-line search query engine which enables flexible look-ups using synonymous of the search query. Such an approach would preferably include an automatic synonym look-up feature for Yellow Pages subject headings. Moreover, the approach would preferably enable topical searches, business name, and brand name searches addition to standard Yellow Pages search engine functionality.

SUMMARY OF THE INVENTION

An embodiment of the present invention provides a system and method for facilitating presentation of subject categorizations for use in an on-line search query engine. A synonym list is built which includes a set of synonym entries. Each synonym entry includes a synonym name and a heading code. The synonym list is arranged in order of synonym name. A search query is accepted from a user on the on-line search query engine. The search query is normalized into a standardized word form with at least one word from the standardized word form matching one of the synonym names in the synonym list. Each of the synonym entries in the synonym list having at least one synonym name matching the at least one word in the standardized word form is retrieved. A heading list which includes a set of heading entries is accessed. Each heading entry includes a heading name and a heading code. The heading list is arranged in order of heading code. Subject categorizations are presented as the heading names from each entry in the heading list having a heading code matching one of the heading codes in each of the retrieved synonym list entries.

A further embodiment of the present invention provides a system and method for automatically locating headings in an on-line directory listing service responsive to a user search query. A heading list including a set of heading entries, each of which includes a heading name, is accessed. A synonym list including a set of synonym entries, each of which includes a synonym name, is accessed. A one-to-many relationship between each heading entry in the heading list and one or more synonym entries in a synonym list is formed. Each synonym name in the one or more synonym entries constitutes a synonym of the heading name in the heading entry. A search query from a user requesting information from the on-line directory listing service is accepted. The search query is parsed for individual terms. Each synonym entry in a synonym list is found with each found synonym entry matching one or more of the individual terms from the search query. The heading name from each heading entry in the headings list is retrieved for each heading entry that is related to each of the found synonym entries from the synonym list.

A still further embodiment of the invention provides a system and method for automatically locating headings using structured query language (SQL) in an on-line directory listing service responsive to a user search query. A heading table comprising a set of heading records each of which comprises a heading field storing a heading name and a synonym field storing one or more synonym names is accessed. Each synonym name in the synonym field includes a synonym of the heading name in the heading field. A search query is accepted from a user requesting information from the on-line directory listing service. The search query is parsed for individual terms. Each heading record in the heading table having a synonym name in the synonym field matching one or more of the individual terms from the search query is found using an SQL query. The heading name from each heading field for each of the found heading records in the heading table is retrieved.

Using a Web browser, a user can thus enter a search query and receive back subject categorizations with automatic synonym look-up. The section headings can be nested in a hierarchical manner. In addition, the user can enter a business or brand name as a search query and received back listings of businesses relating to that search query. This approach avoids the prior art limitations by enabling a user to flexibly specify broad search queries not restricted to a limited range of words for specific search terms appearing in the Yellow Pages headings themselves.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2A is a screen shot of a Web page showing, by way of example, a simple category search using the system of FIG. 1;

FIG. 2B is a screen shot of a Web page showing the subject categorizations retrieved responsive to the search query submitted via the Web page of FIG. 3A;

FIG. 3B is a screen shot of a Web page showing the subject categorizations retrieved responsive to the search query submitted via the Web page of FIG. 3A;

FIG. 4A is a screen shot of a Web page showing, by way of example, a business name search using the system of FIG. 1;

FIG. 5B is a screen shot of a Web page showing the subject categorizations retrieved responsive to the search query submitted via the Web page of FIG. 5A;

FIG. 6 is a data structure showing the layout of an entry in the heading list for use in the system of FIG. 1;

FIG. 7 is a data structure showing the layout of an entry in the synonym list for use in the system of FIG. 1;

FIG. 8 is a data structure showing the layout of an entry in the cross-reference list for use in the system of FIG. 1;

FIG. 9 is a data structure showing the layout of an entry in the brand list for use in the system of FIG. 1;

DETAILED DESCRIPTION OF THE PREFERRED EMBODIMENT

Figure 1:
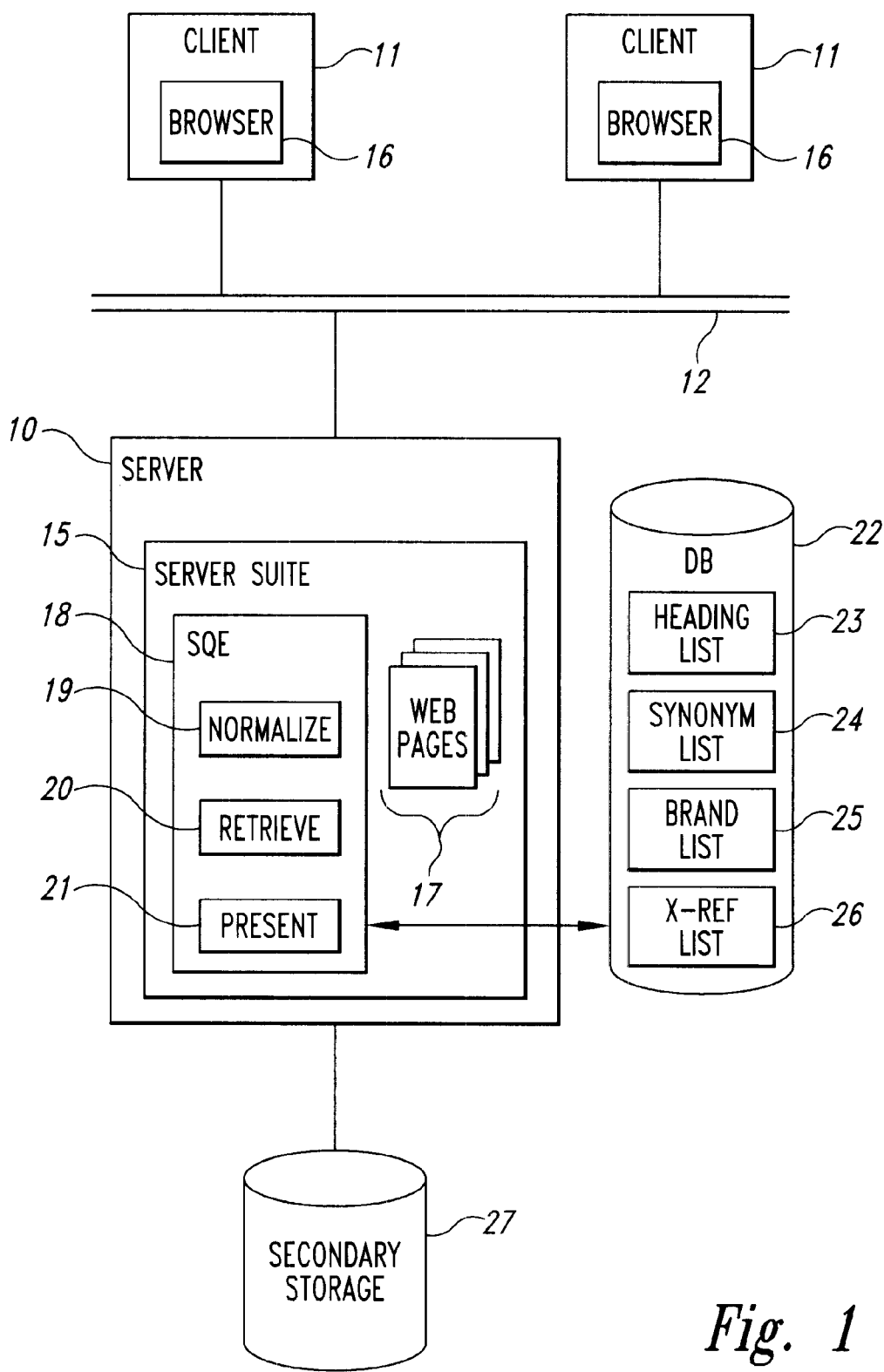
FIG. 1 is a block diagram of a system for facilitating presentation of subject categorizations for use in an on-line search query engine in accordance with the present invention.

FIG. 1 is a block diagram of a system 9 for facilitating presentation of subject categorizations for use in an on-line search query engine 18 in accordance with the present invention. The system 9 generally operates in a distributed computing environment including individual computer systems interconnected over a network, although the system 9 could equally function as a single stand-alone computer system. In the described embodiment, a server 10 is interconnected with a plurality of clients 11 over a network 12, such as an internetwork, including the Internet, or an intranetwork. The server 10 includes a memory (not shown) into which is loaded a server suite 15. The server suite 15 provides the controls and functionality for an Internet service provider. For example, the server suite 15 publishes Web pages 17, thereby making each Web page 17 available to the clients 11 over the network 12. In accordance with the present invention, the server suite 15 further includes a search query engine 18 which includes a normalize module 19, a retrieve module 20, and a presentation module 21, as further described below, beginning with reference to FIG. 10.

The server 10 is also interconnected with a secondary storage 27 which can comprise any form of conventional random or non-random access storage device, such as a hard drive or CD ROM player with fixed or removable media, as is known in the art. Each Web page 17 is accessed by end users via Web browsers 16 operating on each client 11 over the network 12. Each client 11 includes user interface devices, such as keyboards and monitors (not shown) as is known in the art by which search queries are input and subject categorizations are output.

The search query engine 18 is coupled to a database 22 which includes a heading list 23, a synonym list 24, a brand list 25, and a cross-reference list 26. The format of the data structures used in the heading list 22, the synonym list 24, the brand list 25, and the cross-reference list 26 are further described below with reference to FIGS. 5, 6, 7, and 8, respectively. The database 22 can be stored on any standard form of secondary storage device.

An exemplary example of a server 10 suitable for use in the present invention is an Intel Pentium-based computer system having the following characteristics: 64 MB RAM, 10.0 GB hard drive, and network server connectivity. In the described embodiment, the server suite 15 is a proprietary server suite written for and used exclusively by InfoSpace.com, Redmond, Wash., which provides functionality similar to the Microsoft Windows NT Server Suite. The proprietary service suite supports a simple page-creation programming language that requires no knowledge of HTML programming or FTP uploads.

The system 9 of FIG. 1 allows a user to search for three types of Yellow Pages information: categories, business names, and brands. A category specifies a specific type of goods or services. A business name identifies a specific provider of goods or services. A brand identifies those categories of goods and services relating to those goods and services which are provided by the brand in question.

FIG. 2A is a screen shot of a Web page 30 showing, by way of example, a simple category search using the system 9 of FIG. 1. A simple category search consists of a single search term. The user first selects the "Category" radio button 31 for indicating to the search query engine 18 that a subject category-type search is desired. The user then enters the search query 32, here "physician," into a text input box 33 and submits the search query 32 by pressing a virtual "Find" button 34.

FIG. 2B is a screen shot of a Web page 35 showing the subject categorizations 36 (or headings) retrieved by the search query engine 18 responsive to the search query 32 submitted via the Web page 30 of FIG. 2A. The subject categorizations 36 are retrieved from the heading list 23 (shown in FIG. 1) and can be individual headings selected by the user to obtain further sub-headings or individual business listings.

Figure 3A:
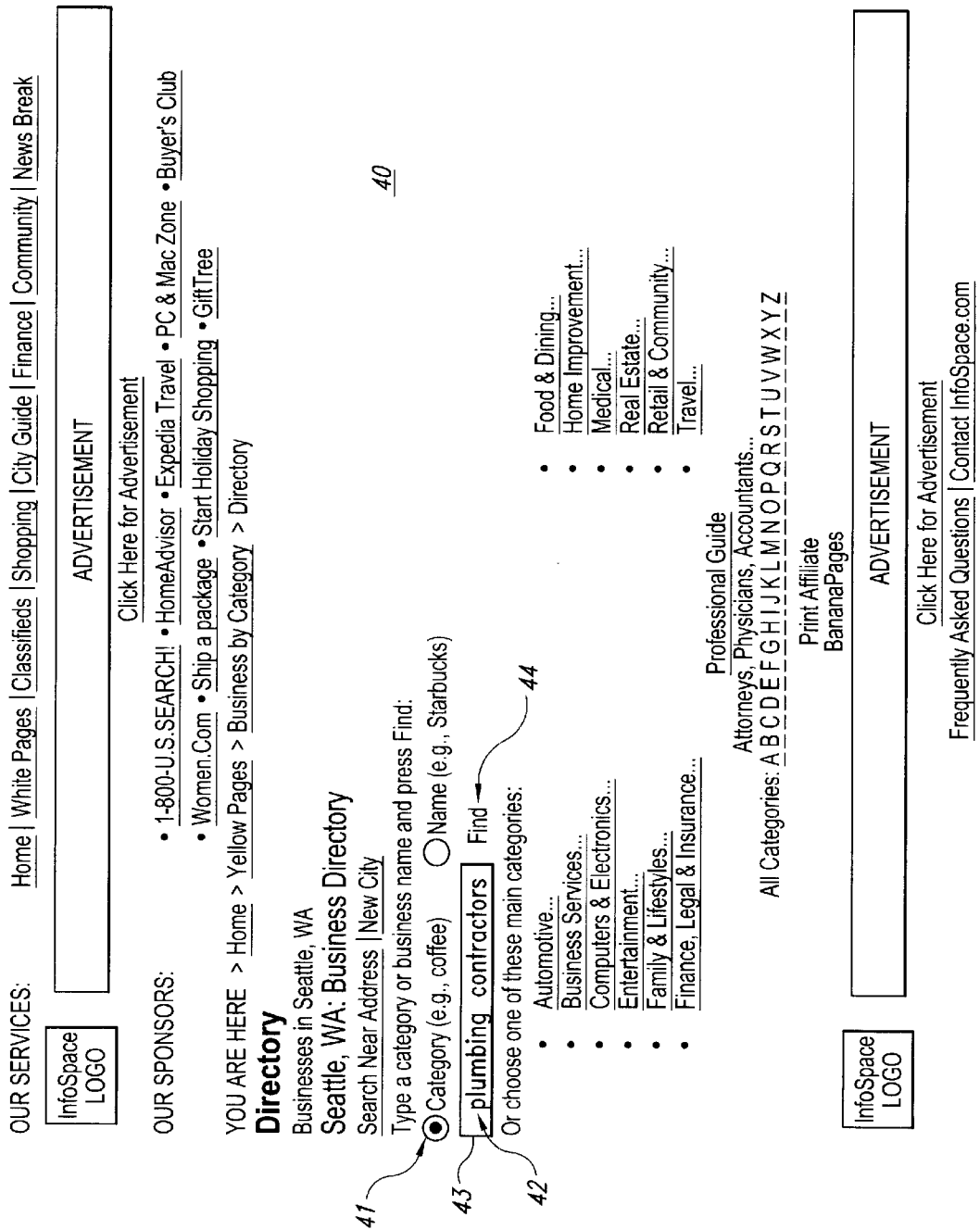
FIG. 3A is a screen shot of a Web page showing, by way of example, a compound category search using the system of FIG. 1.

FIG. 3A is a screen shot of a Web page 40 showing, by way of example, a compound category search using the system 9 of FIG. 1. A compound category search consists of two or more search terms. Again, the user selects the "Category" radio button 41 and enters a multiword search query 42, here "plumbing contractors," into a text input box 43. The multiword search query 42 is "tokenized" by the search query engine 18, as further described below with reference to FIG. 10. The search query 42 is submitted to the search query engine 18 by the user pressing the virtual "Find" button 44.

FIG. 3B is a screen shot of a Web page 45 showing the subject categorizations (or headings) 46 retrieved by the search query engine 18 responsive to the search query 42 submitted via the Web page 40 of FIG. 3A. The subject categorizations 46 are based on synonyms of each of the individual words making up the multiword search query 42.

FIG. 4A is a screen shot of a Web page 50 showing, by way of example, a business name search using the system 9 of FIG. 1. The user selects the "Name" radio button 51 to indicate to the search query engine 18 that a business name search is desired. The user then enters a search query 52 by specifying a business name, here "Hertz," into the text input box 53. The search query 52 is submitted to the search query engine 18 by the user pressing the virtual "Find" button 54.

Figure 4B:
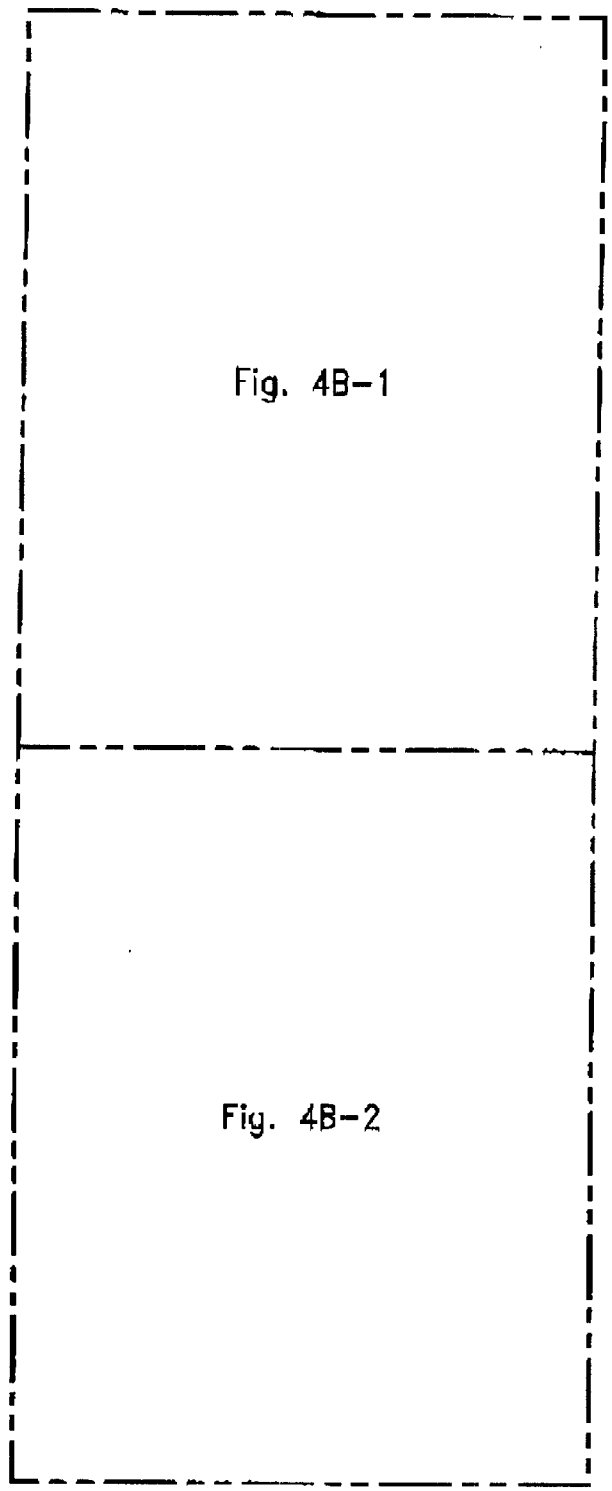
FIG. 4B is a screen shot of a Web page showing the businesses retrieved responsive to the search query submitted via the Web page of FIG. 4A.

FIG. 4B is a screen shot of a Web page 55 showing the businesses 56 retrieved responsive to the search query 52 submitted via the Web page 50 of FIG. 4A. Individual business names 56 which match the search query 52 are displayed.

Figure 5A:
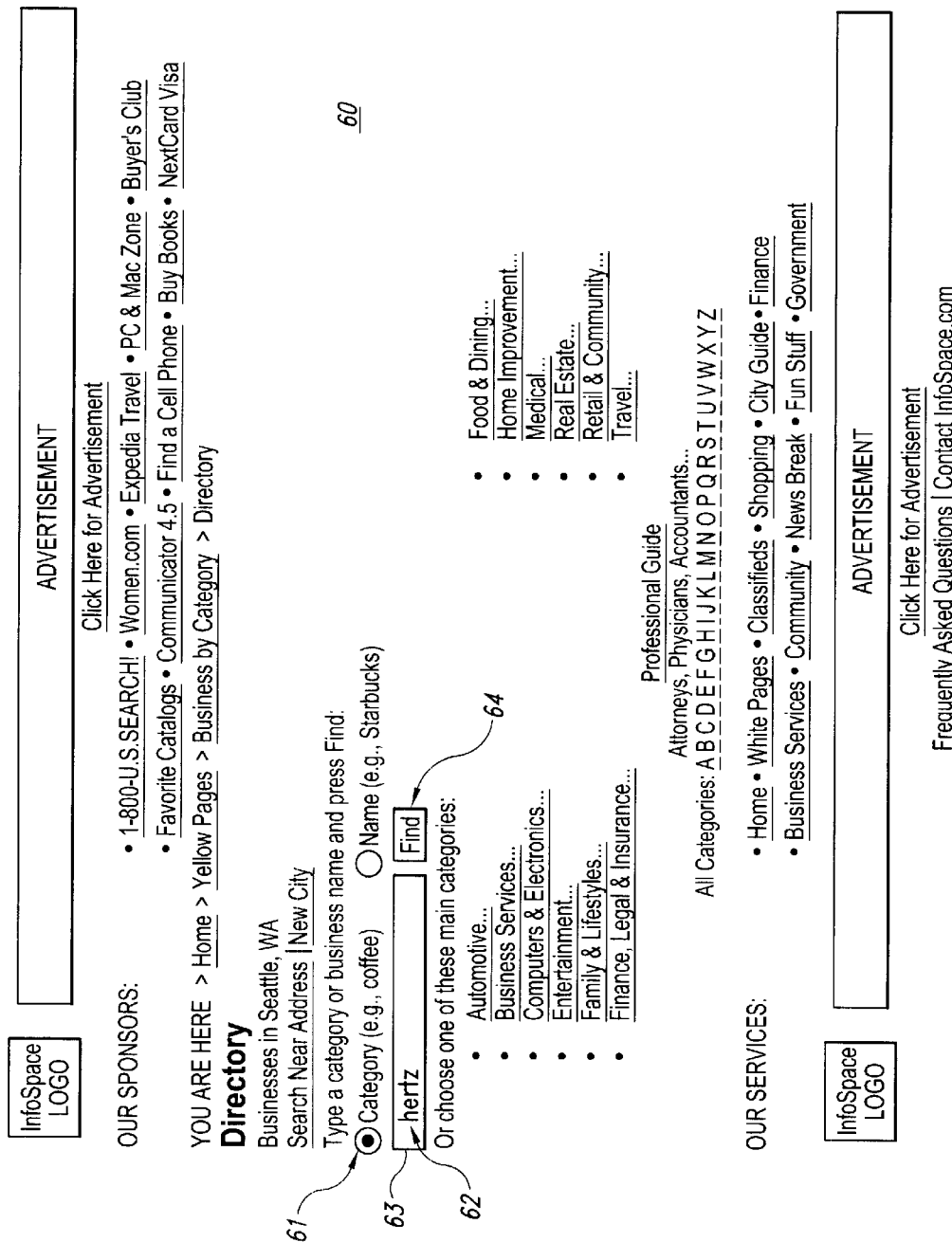
FIG. 5A is a screen shot of a Web page showing, by way of example, a brand search using the system of FIG. 1.

FIG. 5A is a screen shot of a Web page 60 showing, by way of example, a brand search using the system 9 of FIG. 1. The user selects the "Category" radio button 61 to indicate to the search query engine 18 that a brand search is desired. The user then enters a search query 62 by specifying a brand, here "Hertz," into the text input box 63. The search query 62 is submitted to the search query engine 18 by the user pressing the virtual "Find" button 64.

FIG. 5B is a screen shot of a Web page 65 showing the subject categorizations 66 retrieved responsive to the search query 62 submitted via the Web page 60 of FIG. 5A. Individual subject categories 66 which match the search query 62 are displayed.

FIG. 6 is a data structure showing the layout of a heading entry 70 in the heading list 23. Each heading entry 70 consists of a numeric heading code 71 and an alphanumeric heading name 72. The heading list 23 is preferably arranged in order of heading codes 71 in increments of 200, although any increment or form of identification is acceptable. In the described embodiment, the heading list 23 is a flat file.

FIG. 7 is a data structure showing the layout of a synonym entry 75 in the synonym list 24. Each synonym entry 75 consists of an alphanumeric synonym name 76 and a numeric heading code 77. The synonym list 24 is preferably arranged in order of synonym name 76. In the described embodiment, the synonym list 24 is a flat file.

As shown, the heading entry 70 in the heading list 23 includes a heading code 71 of "2400" and a heading name 72 of "physician." The synonym entries 75 in the synonym list 24 have a corresponding heading code 77 of "2400." These synonym entries 75 represent the synonyms corresponding to the heading name 72 of "physician" in the heading list 23. Thus, there is a one-to-many relationship between each heading entry 70 in the heading list 23 and one or more synonym entries 75 in the synonym list 24.

FIG. 8 is a data structure showing the layout of a cross-reference cross-reference entry 80 in the cross-reference list 26. Each cross-reference entry 80 consists of an alphanumeric publisher name 81, an alphanumeric publisher code 82, an alphanumeric heading name 83, and a numeric heading code 84. In the described embodiment, the cross-reference list 26 is a flat file. Third party database publishers, such as Metro 1, provide databases of synonyms for headings. These third party databases can serve as the foundation for a synonym list, such as synonym list 24. However, these third party databases generally lack the particular hierarchical indexing required by a Yellow Pages-type search query engine 18 as in the described embodiment. Nevertheless, the synonym information from such third party databases can be imported into the synonym list 24 by use of a cross-reference list 26 as further described below with reference to FIG. 12.

FIG. 9 is a data structure showing the layout of a brand entry 90 in the brand list 25. Each brand entry 90 consists of an alphanumeric brand name 91 and a numeric heading code 92. The brand list 25 is preferably arranged in order of brand name 91. In the described embodiment, the brand list 25 is a flat file. Like the heading list 23, there is a one-to-many relationship between each brand entry 90 in the brand list 25 and one or more synonym entries 75 in the synonym list 24. The brand list 25 is built by analyzing the raw heading list 23, as further described below with reference to FIG. 11.

Figure 10:
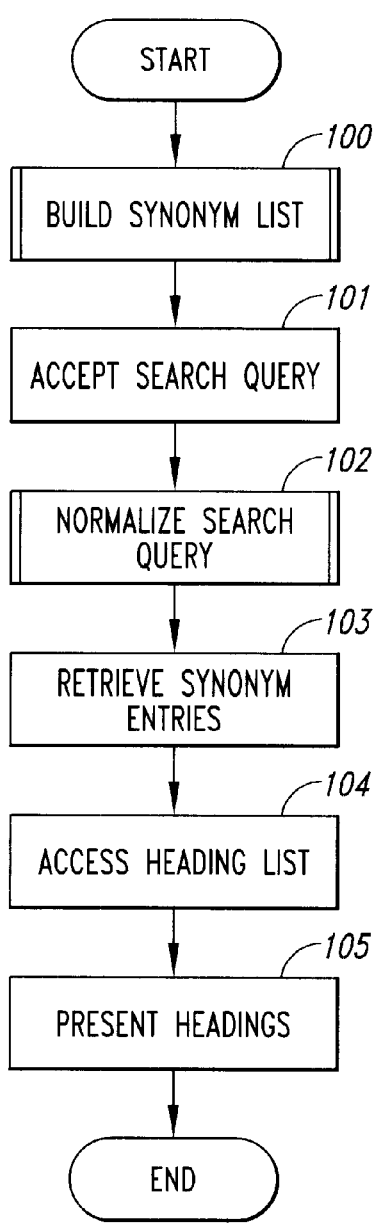
FIG. 10 is a flow diagram of a method for facilitating presentation of subject categorizations for use in an on-line search query engine in accordance with the present invention.

FIG. 10 is a flow diagram of a method for facilitating presentation of subject categorizations 36, 46, 56 for use in an on-line search query engine 18 in accordance with the present invention. In the described embodiment, the method is written in both the C and C++ programming languages as part of the server suite 15.

The method begins by building a synonym list 24 (block 100) which in the described embodiment is completed prior to the execution of the JAVA applet. A search query 32, 42, 52 is accepted into the Web page 30, 40, 50 (block 101). The search query 32, 42, 52 is normalized (block 102) to match each word in the search query 32, 42, 52 to the format of individual synonym names 76 stored in the synonym list 24. The normalization of the search query 32, 42, 52 is further described below with reference to FIG. 14.

Next, the synonym entries 75 in the synonym list 24 which match one or more individual words in the search query 32, 42, 52 are retrieved (block 103). The heading list 23 is accessed (block 104) and the heading names 72 in each heading entry 70 of the heading list 23 which match the heading code 77 in each of the retrieved synonym entries 75 from the synonym list 24 are presented as subject categorizations 36, 46, 56 (block 105).

Figure 11:
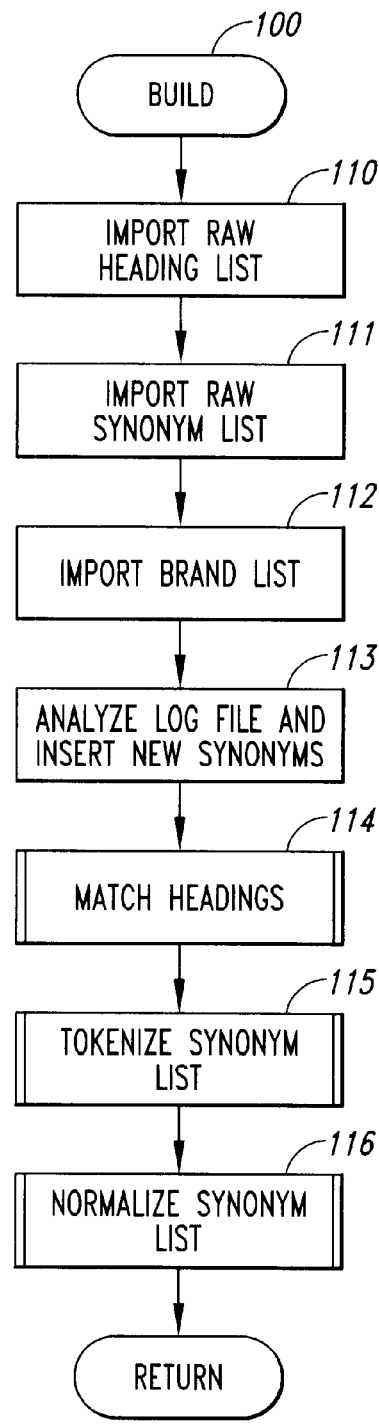
FIG. 11 is a flow diagram of a routine for building a synonym list for use in the method of FIG. 10.

FIG. 11 is a flow diagram of the routine for building the synonym list 100 for use in the method of FIG. 10. The purpose of this routine is to progressively combine multiple raw lists into the synonym list 24 and heading list 23. Thus, the routine first imports a raw heading list (block 110) and a raw synonym list (block 111), both of which have a structure identical to that of the heading list 23 and the synonym list 24, respectively. Given the one-to-many relationship shared between the heading list 23 and the synonym list 24, the synonym list 24 is built by matching each synonym entry 75 in the raw synonym list with one heading entry 70 in the raw heading list. Thus, the final synonym list 24 is formed when each of the synonym entries 75 therein corresponds to only one heading entry 70 in the heading list 23. Similarly, the brand list 25 is imported (block 112) by matching each brand entry 90 in the brand list 25 to only one heading entry 70 in the heading list 23.

In a further embodiment of the present invention, the synonym list 24 can be augmented with additional synonym names 76 based on words in search queries 32, 42, 52 which have been missed by the search query engine 18. A log file (not shown) can be used to track missed words, which each represent an unsuccessful retrieval of a synonym entry 75 from the synonym list 24. The log file can be manually analyzed and the missed words are inserted as new synonyms into the synonym list 24 (block 113).

In a still further embodiment of the present invention, the synonym list 24 can be augmented with additional synonym names 76 received from a third party publisher. The search query engine 18 matches the heading names 72 in the heading list 23 to the publisher headings 81 in the cross-reference list 26 (block 114) as further described below with reference to FIG. 12.

In a still further embodiment of the present invention, the search query engine 18 tokenizes each multiword synonym entry 75 in the synonym list 24 (block 115) as further described below with reference to FIG. 13. Finally, each synonym name 76 in the synonym list 24 is normalized (block 116) as further described herein below with reference to FIG. 14. The routine then returns.

In a still further embodiment of the present invention, the brand list 25 is built by analyzing the raw heading list for listing names which occur with a high frequency. For instance, the occurrence of more than one hundred "7-11" convenience stores indicates that "7-11" is a brand name which should be added to the brand list 25. Thus, the raw heading list is ordered for unique occurrences of each listing and those which occur more than 100 times are used as a brand name. In addition, some brand names can be associated with a type of goods or services. For instance, "Sony" can be synonymous with "electronics." In the described embodiment, the synonym list 24 entries for "Sony" include the term "electronics." Consequently, a search query for the brand name "Sony" will result in subject categorizations which include "electronics."

Figure 12:
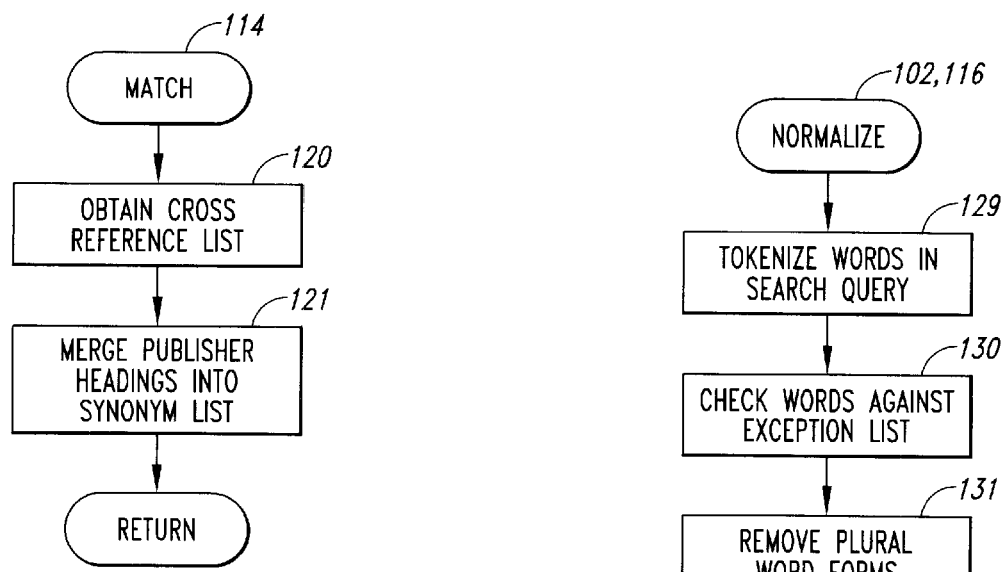
FIG. 12 is a flow diagram of a routine for matching headings for use in the routine of FIG. 11.

FIG. 12 is a flow diagram of the routine for matching headings 114 for use in the routine of FIG. 10. The purpose of the cross-reference list 26 is to allow the synonym list 24 to be built up with the heading names from third party publisher lists. The routine begins by obtaining the cross-reference list 26 (block 120). The search query engine 18 then merges the publisher headings 81 with the heading names 72 in the synonym list 24 (block 121).

Figure 13:
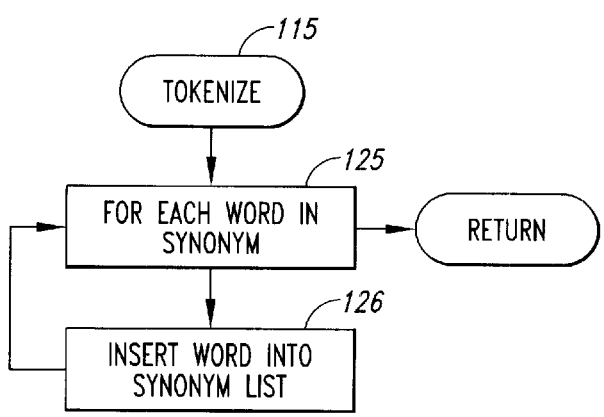
FIG. 13 is a flow diagram of a routine for tokenizing a synonym list for use in the routine of FIG. 11.

FIG. 13 is a flow diagram of the routine for tokenizing the synonym list 115 for use in the routine of FIG. 11. The term "tokenize" refers to the parsing out and insertion of individual substantive words extracted from each multiword synonym name 76 in the synonym list 24. Tokenizing increases the ability of the search query engine 18 to expand the range of applicable synonyms for a given search query 32, 42, 52. Thus, for each word in a multiword synonym entry 76 in the synonym list 24 (block 125), the word is inserted into the synonym list 24 (block 126). For example, the multiword synonym name "plumbing contractors" can be tokenized into two additional synonym entries 75 in the synonym list 24: "Plumbing" and "Contractors." The routine then returns.

Figure 14:
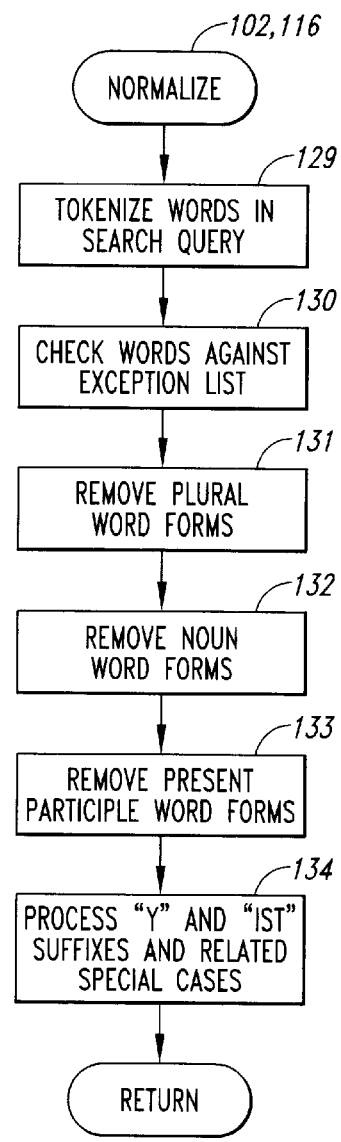
FIG. 14 is a flow diagram of a heuristic routine for normalizing a search query or synonym name in the synonym list for use in the routine of FIG. 11.

FIG. 14 is a flow diagram of the heuristic routine for normalizing a search query 102, or synonym name 116 for use in the method of FIG. 10 and in the routine of FIG. 11, respectively. The process of normalization is driven by the structure and organization of individual synonym names 76 in the synonym list 24. The routine begins by checking each word in the search query 32, 42, 52 or synonym name 76 against a list of word exceptions (block 130). In the described embodiment, the words "movie" and "play" are used. Next, any plural form of a word is removed, that is, suffixes of "s," "es," and "ies," and "ys" are removed (block 131).

In addition to an exception list and plural word form, any noun word form, such as "er," are removed (block 132) and any present participle word form, such as "ing," are removed (block 133). Finally, any suffices using the letter "y" or letters "ist" are removed in addition to other special related cases of unusual word endings as is necessary (block 134). The routine then returns.

Figure 15:
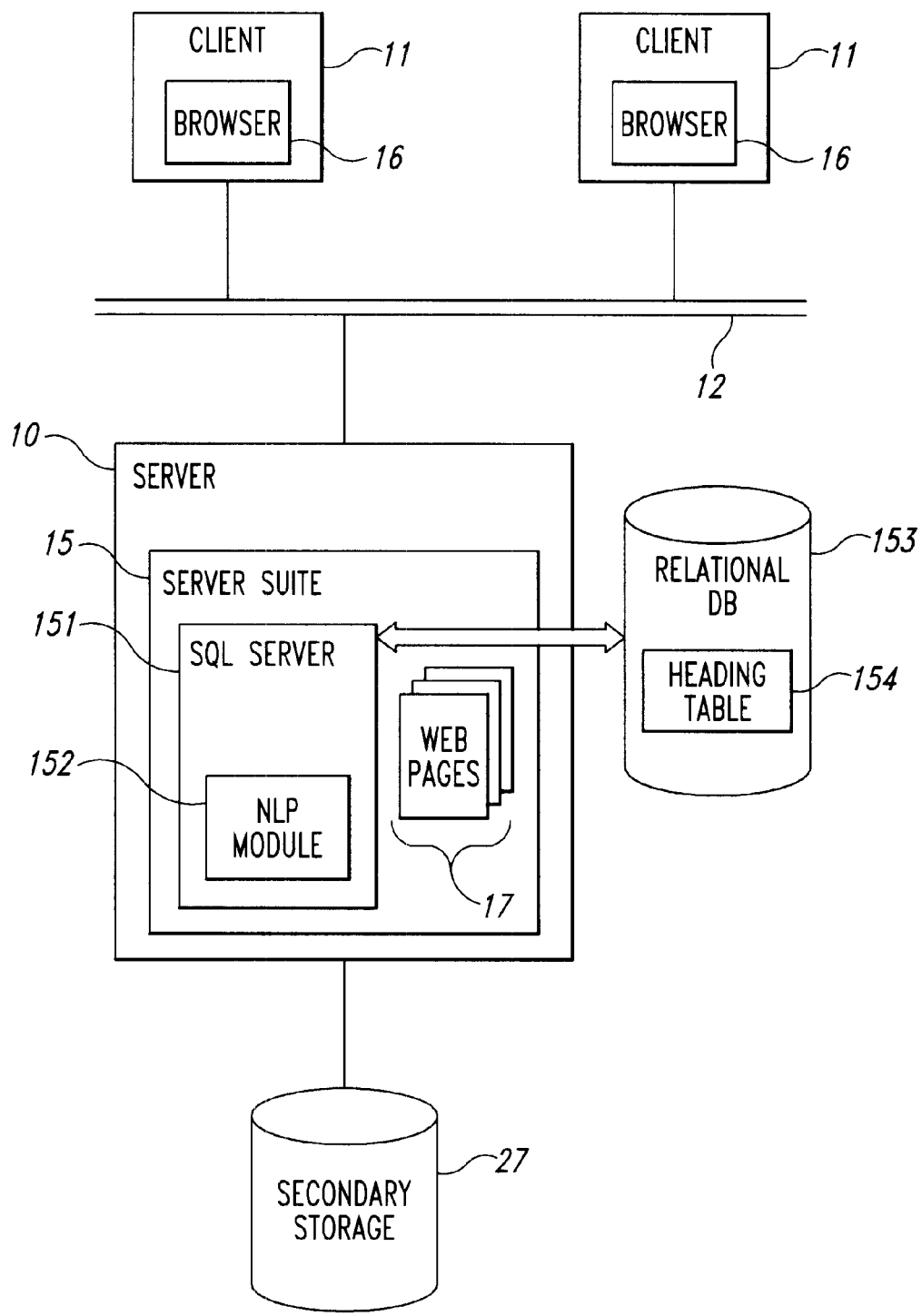
FIG. 15 is a block diagram of a further embodiment of a system for facilitating presentation of subject categorizations in accordance with the present invention.

FIG. 15 is a block diagram of a further embodiment of a system 150 for facilitating presentation of subject categorizations in accordance with the present invention. The system 150 replaces the search query engine 18 (shown in FIG. 1) with a structured query language (SQL) server 151 and merges the heading list 23, the synonym list 24, the brand list 25, and the cross reference list 26 into a single heading table 154 stored in a relational database 153 interconnected with the SQL server 151. The SQL server 151 includes a natural language processing (NLP) module 152 replaces the operations of normalizing a search query by providing facilities for determining each root word corresponding to the words making up a search query.

In the described embodiment, the SQL server 151 is the Microsoft SQL Server 7.0 product, licensed by Microsoft Corporation, Redmond, Wash. The SQL server product includes an English query feature for deriving root words from search query names.

Figures 16, 17:
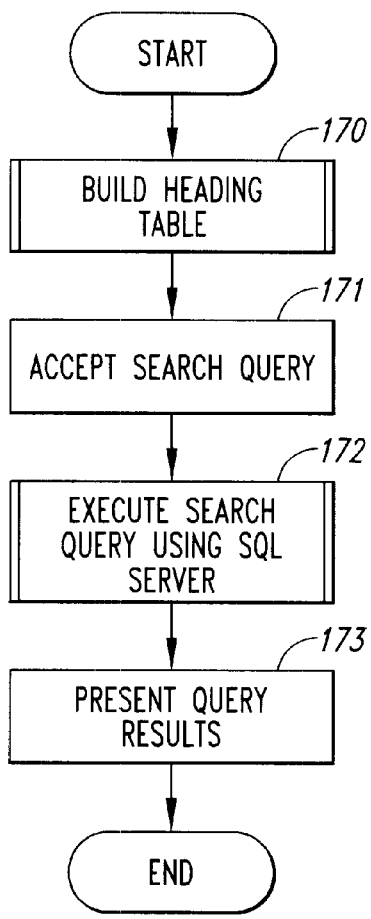
FIG. 16 is a database schema diagram for a heading table used by the system of FIG. 15.
FIG. 17 is a flow diagram of a further embodiment of a method for facilitating presentation of subject categorizations in accordance with the present invention.

FIG. 16 is a database schema diagram 160 for the heading table 154 used by the system of FIG. 15. The schema defines the record structure of the heading table 154 for the combined storage of heading codes, heading names and synonyms. The heading table 154 has three columns corresponding to HeadCode 161, HeadName 163, and Synonyms 166. Heading codes are stored in the HeadCode field 161 which is defined as an integer value 162. Heading names are stored in the HeadName field 163 which is defined as a variable character element 164 having a size 165 not to exceed 100 characters. Synonyms are stored in the Synonyms field 166 which is defined as a variable character element 167 having a size 168 not to exceed 2,000 characters in length. Each record in the heading table 154 is searchable using any of the three fields HeadCode 161, HeadName 163, and Synonyms 166.

FIG. 17 is a flow diagram of a further embodiment of a method for facilitating presentation of subject categorizations 36, 46, 56 in accordance with the present invention. The method begins by building the heading table 154 (block 170), as further described below with reference to FIG. 18.

A search query 32, 42, 52 is accepted into the Web page 30, 40, 50 (block 171). The search query 32, 42, 52 is executed using the SQL server 151 (block 172), as further described below with reference to FIG. 19. Finally, the search query results are presented to the user as subject categorizations 36, 46, 56 (block 173).

Figure 18:
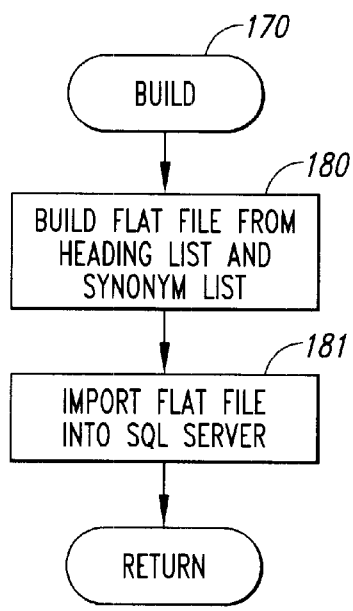
FIG. 18 is a flow diagram of a routine for building a heading table for use in the method of FIG. 17.

FIG. 18 is a flow diagram of the routine for building the heading table 170 for use in the method of FIG. 17. The purpose of this routine is to convert the existing heading list 23 and synonym list 24 into the heading table 154 stored in the relational database 153. Thus, a flat file is built from the heading list 23 and synonym list 24 (shown in FIG. 1) (block 180). The flat file uses the same database schema 160 as used by the heading table 154. Each row in the flat file includes a heading code, a heading name, and one or more synonyms corresponding to the heading name. Each entry in the synonym list 24 must be iteratively matched to one, and only one, heading name in the flat file. Upon completion of the flat file build (block 180), the flat file is exported to the SQL server 151 which stores the flat file as the heading table 154 in the relational database 153 in accordance with the database schema 160 (block 181).

Figure 19:
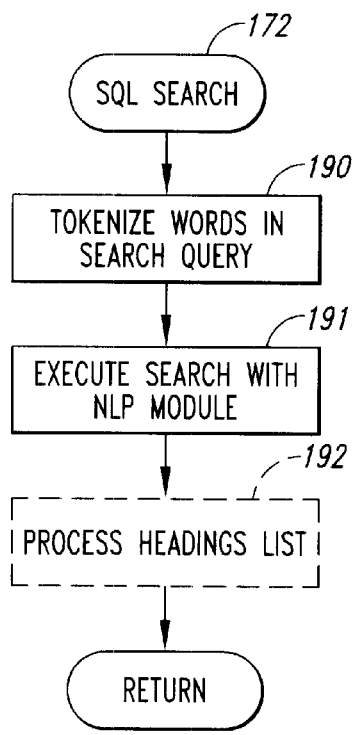
FIG. 19 is a flow diagram of a routine for executing a structured query language (SQL) search for use in the method of FIG. 17.

FIG. 19 is a flow diagram of the routine for executing an SQL search 172 for use in the method of FIG. 17. Each of the words in the search query 32, 42, 52 are tokenized (block 190). The tokenization is rule-based and involves parsing the search query 32, 42, 52 to first remove all punctuation marks, including quotation marks, and to compress all white space into a single space. For example, the search query "flower-shop" is tokenized into "flower shop." Next, the search query is executed by the SQL server 151 using the NLP module 152 to convert each word in the search query 32, 42, 52 into a root word form (block 191). In the described embodiment, the following SQL search query is used:

select HeadCode, HeadName from Heading where
Synonyms contains (Synonyms, "'flower' near 'shop'" )

Where a list of heading codes HeadCode 161 and heading names HeadName 163 are returned by the SQL server 151. The list of heading names HeadName 163 can then be displayed as the subject categorizations 36, 46, 56.

Optionally, the list of heading names HeadName 163 returned by the SQL server 151 can be processed (block 192) prior to being displayed as subject categorizations 36, 46, 56. For instance, the server suite 15 might be configured to recognize certain heading codes HeadCode 161 as a trigger for placing advertisements on the Web page. For example, the heading code 161 for florists might trigger the placement of advertising for florists on the Web page 30, 40, 50. As a further example, some heading names HeadName 163 include a set of subheading names which are displayed on a further Web page upon the selection of the parent heading name HeadName by the user. The server suite 15 can add an indication, such as an ellipses following the heading name HeadName 163, for indicating the presence of children subheading names. Other types of processing of the list of heading codes HeadCode 161 are possible.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for facilitating presentation of subject categorizations for use in an on-line search query engine, comprising:

a synonym list comprising a set of synonym entries, each synonym entry comprising a synonym name and a heading code, the synonym list being arranged in order of synonym name;

a heading list comprising a set of heading entries, each heading entry comprising a heading name and a heading code, the heading list being arranged in order of heading code; and a search query engine accepting a search query from a user and including:

a normalization module normalizing the search query into a standardized word form with at least one word in the standardized word form matching one of the synonym names in the synonym list;

a retrieval module retrieving each of the synonym entries in the synonym list having at least one synonym name matching the at least one word in the standardized word form; and a presentation module presenting as subject categorizations the heading names from each entry in the heading list having a heading code matching one of the heading codes in each of the retrieved synonym list entries.

2. A system according to claim 1, the normalization module further comprising a processing module processing each word in the search query by checking the word against a list of word exceptions, removing a plural word form, removing a noun word form, and removing a present participle word form.

3. A system according to claim 1, further comprising:

a list building module importing a raw heading list comprising a set of raw heading entries, each raw heading entry comprising a raw heading name and a heading code, the raw heading list being arranged in order of heading code, importing a raw synonym list comprising a set of raw synonym entries, each raw synonym entry comprising a raw synonym name and a heading code, the raw synonym list being arranged in order of raw synonym name, and matching each heading name in the raw heading list to at least one synonym name in the raw synonym list, thereby forming a new entry in the synonym list comprising the raw synonym name and the heading code from the raw heading list.

4. A system according to claim 3, further comprising:

a cross reference list comprising a set of cross-referenced entries, each cross-referenced entry comprising a publisher heading name, a publisher heading code, a heading name and a heading code; and the list building module further comprising a merging module merging each cross-referenced entry in the cross reference list into the synonym list, thereby forming a new entry in the synonym list comprising the publisher heading name and the heading code.

5. A system according to claim 3, the list building module further comprising a tokenizer module tokenizing the synonym list by forming an additional new entry in the synonym list for each new entry in the synonym list comprising a plurality of words, each additional new entry in the synonym list comprising one of the plurality of words and the heading code for the new entry in the synonym list.

6. A system according to claim 5, the tokenizer module further comprising a normalizer module normalizing the synonym list by processing each word in the additional new entry in the synonym list by checking the word against a list of word exceptions, removing a plural word form, removing a noun word form, removing a present participle word form, and processing special word cases.

7. A system according to claim 3, further comprising:
a brand list comprising a set of brand entries, each brand entry comprising a brand name and a heading code, the brand list being arranged in order of brand name; and
the list building module further comprising a matcher module matching each brand name in the brand list to at least one heading name in the raw heading list, thereby forming a new entry in the synonym list comprising the brand name and the heading code from the raw heading list.

8. A system according to claim 1, wherein the subject categorizations comprise business directory headings.

9. A method for facilitating presentation of subject categorizations for use in an on-line search query engine, comprising:
building a synonym list comprising a set of synonym entries, each synonym entry comprising a synonym name and a heading code, the synonym list being arranged in order of synonym name;
accepting a search query from a user on the on-line search query engine;
normalizing the search query into a standardized word form with at least one word in the standardized word form matching one of the synonym names in the synonym list;
retrieving each of the synonym entries in the synonym list having at least one synonym name matching the at least one word in the standardized word form;
accessing a heading list comprising a set of heading entries, each heading entry comprising a heading name and a heading code, the heading list being arranged in order of heading code; and
presenting as subject categorizations the heading names from each entry in the heading list having a heading code matching one of the heading codes in each of the retrieved synonym list entries.

10. A method according to claim 9, the operation of normalizing the search query further comprising:
processing each word in the search query by:
checking the word against a list of word exceptions;
removing a plural word form;
removing a noun word form;
removing a present participle word form; and
processing special word cases.

11. A method according to claim 9, the operation of building a synonym list further comprising:
importing a raw heading list comprising a set of raw heading entries, each raw heading entry comprising a raw heading name and a heading code, the raw heading list being arranged in order of heading code;
importing a raw synonym list comprising a set of raw synonym entries, each raw synonym entry comprising a raw synonym name and a heading code, the raw synonym list being arranged in order of raw synonym name; and
matching each heading name in the raw heading list to at least one synonym name in the raw synonym list, thereby forming a new entry in the synonym list comprising the raw synonym name and the heading code from the raw heading list.

12. A method according to claim 11, the operation of matching each heading name further comprising:
obtaining a cross reference list comprising a set of cross-referenced entries, each cross-referenced entry comprising a publisher heading name, a publisher heading code, a heading name and a heading code; and
merging each cross-referenced entry in the cross reference list into thee syynonym list, thereby forming a new entry in the synonym list comprising the publisher heading name and the heading code.

13. A method according to claim 12, further comprising:
tokenizing the synonym list by:
forming an additional new entry in the synonym list for each new entry in the synonym list comprising a plurality of words, each additional new entry in the synonym list comprising one of the plurality of words and the heading code for the new entry in the synonym list.

14. A method according to claim 13, further comprising:
normalizing the synonym list by processing each word in the additional new entry in the synonym list by:
checking the word against a list of word exceptions;
removing a plural word form;
removing a noun word form; and
removing a present participle word form.

15. A method according to claim 12, further comprising:
importing a brand list comprising a set of brand entries, each brand entry comprising a brand name and a heading code, the brand list being arranged in order of brand name; and
matching each brand name in the brand list to at least one heading name in the raw heading list, thereby forming a new entry in the synonym list comprising the brand name and the heading code from the raw heading list.

16. A method according to claim 9, wherein the subject categorizations comprise business directory headings.

17. A computer-readable storage medium holding instructions for facilitating presentation of subject categorizations for use in an on-line search query engine, comprising:
a synonym list comprising a set of synonym entries, each synonym entry comprising a synonym name and a heading code, the synonym list being arranged in order of synonym name;
a heading list comprising a set of heading entries, each heading entry comprising a heading name and a heading code, the heading list being arranged in order of heading code; and
a search query engine accepting a search query from a user and including:
a normalization module normalizing the search query into a standardized word form with at least one word in the standardized word form matching one of the synonym names in the synonym list;
a retrieval module retrieving each of the synonym entries in the synonym list having at least one synonym name matching the at least one word in the standardized word form; and
a presentation module presenting as subject categorizations the heading names from each entry in the heading list having a heading code matching one of the heading codes in each of the retrieved synonym list entries.

18. A storage medium according to claim 17, the normalization module further comprising a processing module processing each word in the search query by checking the word against a list of word exceptions, removing a plural word form, removing a noun word form, and removing a present participle word form.

19. A storage medium according to claim 17, further comprising:
a list building module importing a raw heading list comprising a set of raw heading entries, each raw heading entry comprising a raw heading name and a heading code, the raw heading list being arranged in order of heading code, importing a raw synonym list comprising a set of raw synonym entries, each raw synonym entry comprising a raw synonym name and a heading code, the raw synonym list being arranged in order of raw synonym name, and matching each heading name in the raw heading list to at least one synonym name in the raw synonym list, thereby forming a new entry in the synonym list comprising the raw synonym name and the heading code from the raw heading list.

20. A storage medium according to claim 19, further comprising:
   a cross reference list comprising a set of cross-referenced entries, each cross-referenced entry comprising a publisher heading name, a publisher heading code, a heading name and a heading code; and
   the list building module further comprising a merging module merging each cross-referenced entry in the cross reference list into the synonym list, thereby forming a new entry in the synonym list comprising the publisher heading name and the heading code.

21. A storage medium according to claim 19, the list building module further comprising a tokenizer module tokenizing the synonym list by forming an additional new entry in the synonym list for each new entry in the synonym list comprising a plurality of words, each additional new entry in the synonym list comprising one of the plurality of words and the heading code for the new entry in the synonym list.

22. A storage medium according to claim 21, the tokenizer module further comprising a normalizer module normalizing the synonym list by processing each word in the additional new entry in the synonym list by checking the word against a list of word exceptions, removing a plural word form, removing a noun word form, removing a present participle word form, and processing special word cases.

23. A storage medium according to claim 19, further comprising:
   a brand list comprising a set of brand entries, each brand entry comprising a brand name and a heading code, the brand list being arranged in order of brand name; and
   the list building module further comprising a matcher module matching each brand name in the brand list to at least one heading name in the raw heading list, thereby forming a new entry in the synonym list comprising the brand name and the heading code from the raw heading list.

24. A system for automatically locating headings in an on-line directory listing service responsive to a user search query, comprising:
   a heading list comprising a set of heading entries each of which comprises a heading name;
   a synonym list comprising a set of synonym entries each of which comprises a synonym name, each heading entry in the heading list having a one-to-many relationship with one or more synonym entries in the synonym list with each synonym name in the one or more synonym entries comprising a synonym of the heading name in the heading entry; and
   a search query engine accepting a search query from a user requesting information from the on-line directory listing service, parsing the search query for individual terms, finding each synonym entry in the synonym list with each found synonym entry matching one or more of the individual terms from the search query, and retrieving the heading name from each heading entry in the heading list for each heading entry that is related to each of the found synonym entries from the synonym list.

25. A system according to claim 24, further comprising:
   the heading list further comprising a heading code associated with each heading entry in the heading list; and
   the synonym list further comprising the same heading code associated with each of the one or more synonym entries in the synonym list to which the heading entry in the heading list is related.

26. A system according to claim 24, further comprising:
   a brand list comprising a set of brand entries each of which comprises a brand name, each heading entry in the heading list having a one-to-many relationship with one or more brand entries in the brand list with each brand name in the one or more brand entries representing a brand of service under the heading name in the heading entry;
   the search query engine further comprising finding each brand entry in the brand list with each found brand entry matching one or more of the individual terms from the search query and retrieving the heading name from each heading entry in the heading list for each heading entry that is related to each of the found brand entries from the brand list.

27. A system according to claim 26, further comprising:
   the heading list further comprising a heading code associated with each heading entry in the heading list; and
   the brand list further comprising the same heading code associated with each of the one or more brand entries in the brand list to which the heading entry in the heading list is related.

28. A system according to claim 24, the search query engine further comprising normalizing each individual term into a word form corresponding to the word form used in the synonym names in the synonym list.

29. A system according to claim 24, wherein the on-line directory listing service is Web-based with the search query being accepted via a Web page and the heading names being retrieved onto a Web page.

30. A method for automatically locating headings in an on-line directory listing service responsive to a user search query, comprising:
   accessing a heading list comprising a set of heading entries each of which comprises a heading name;
   accessing a synonym list comprising a set of synonym entries each of which comprises a synonym name;
   forming a one-to-many relationship between each heading entry in the heading list and one or more synonym entries in the synonym list with each synonym name in the one or more synonym entries comprising a synonym of the heading name in the heading entry;
   accepting a search query from a user requesting information from the on-line directory listing service;
   parsing the search query for individual terms;
   finding each synonym entry in the synonym list with each found synonym entry matching one or more of the individual terms from the search query; and
   retrieving the heading name from each heading entry in the heading list for each heading entry that is related to each of the found synonym entries from the synonym list.

31. A method according to claim 30, the operation of forming a one-to-many relationship between each heading entry in the heading list further comprising:

entering a heading code into each heading entry in the heading list; and entering the same heading code into each of the one or more synonym entries in the synonym list to which the heading entry in the heading list is related.

32. A method according to claim 30, further comprising:

accessing a brand list comprising a set of brand entries each of which comprises a brand name;

forming a one-to-many relationship between each heading entry in the heading list and one or more brand entries in the brand list with each brand name in the one or more brand entries representing a brand of service under the heading name in the heading entry;

finding each brand entry in the brand list with each found brand entry matching one or more of the individual terms from the search query; and retrieving the heading name from each heading entry in the heading list for each heading entry that is related to each of the found brand entries from the brand list.

33. A method according to claim 32, the operation of forming a one-to-many relationship between each heading entry in the heading list further comprising:

entering a heading code into each heading entry in the heading list; and entering the same heading code into each of the one or more brand entries in the brand list to which the heading entry in the heading list is related.

34. A method according to claim 30, the operation of parsing the search query further comprising:

normalizing each individual term into a word form corresponding to the word form used in the synonym names in the synonym list.

35. A method according to claim 30, wherein the on-line directory listing service is Web-based with the search query being accepted via a Web page and the heading names being retrieved onto a Web page.

36. A computer-readable storage medium holding instructions for automatically locating headings in an on-line directory listing service responsive to a user search query, comprising:

a heading list comprising a set of heading entries each of which comprises a heading name;

a synonym list comprising a set of synonym entries each of which comprises a synonym name, each heading entry in the heading list having a one-to-many relationship with one or more synonym entries in the synonym list with each synonym name in the one or more synonym entries comprising a synonym of the heading name in the heading entry; and a search query engine accepting a search query from a user requesting information from the on-line directory listing service, parsing the search query for individual terms, finding each synonym entry in the synonym list with each found synonym entry matching one or more of the individual terms from the search query, and retrieving the heading name from each heading entry in the heading list for each heading entry that is related to each of the found synonym entries from the synonym list.

37. A storage medium according to claim 36, further comprising:

the heading list further comprising a heading code associated with each heading entry in the heading list; and the synonym list further comprising the same heading code associated with each of the one or more synonym entries in the synonym list to which the heading entry in the heading list is related.

38. A storage medium according to claim 36, further comprising:

a brand list comprising a set of brand entries each of which comprises a brand name, each heading entry in the heading list having a one-to-many relationship with one or more brand entries in the brand list with each brand name in the one or more brand entries representing a brand of service under the heading name in the heading entry;

the search query engine further comprising finding each brand entry in the brand list with each found brand entry matching one or more of the individual terms from the search query and retrieving the heading name from each heading entry in the heading list for each heading entry that is related to each of the found brand entries from the brand list.

39. A storage medium according to claim 38, further comprising:

the heading list further comprising a heading code associated with each heading entry in the heading list; and the brand list further comprising the same heading code associated with each of the one or more brand entries in the brand list to which the heading entry in the heading list is related.

40. A storage medium according to claim 36, the search query engine further comprising normalizing each individual term into a word form corresponding to the word form used in the synonym names in the synonym list.

41. A system for automatically locating headings using structured query language (SQL) in an on-line directory listing service responsive to a user search query, comprising:

a heading table comprising a set of heading records each of which comprises a heading field storing a heading name and a synonym field storing one or more synonym names, each synonym name in the synonym field comprising a synonym of the heading name in the heading field;

an SQL server accepting a search query from a user requesting information from the on-line directory listing service, including:

a natural language module parsing the search query for individual terms; and the SQL server finding each heading record in the heading table having a synonym name in the synonym field matching one or more of the individual terms from the search query; and retrieving the heading name from each heading field for each of the found heading records in the heading table.

42. A system according to claim 41, further comprising:

a Web server interfaced with the SQL server and processing the found heading records prior to presenting the heading name from each heading field.

43. A system according to claim 42, further comprising:

the Web server placing advertisements responsive to certain heading names in the heading field of the found heading records.

44. A system according to claim 42, further comprising:

the Web server presenting an indication of subheading names responsive to certain heading names in the heading field of the found heading records.

45. A system according to claim 41, wherein the heading table is stored in a relational database.

46. A system according to claim 41, further comprising:

the natural language module normalizing each individual term into a tokenized word form.

47. A system according to claim 41, wherein the on-line directory listing service is Web-based with the search query being accepted via a Web page and the heading names being retrieved onto a Web page.

48. A method for automatically locating headings using structured query language (SQL) in an on-line directory listing service responsive to a user search query, comprising:

accessing a heading table comprising a set of heading records each of which comprises a heading field storing a heading name and a synonym field storing one or more synonym names, each synonym name in the synonym field comprising a synonym of the heading name in the heading field;

accepting a search query from a user requesting information from the on-line directory listing service;

parsing the search query for individual terms;

finding each heading record in the heading table having a synonym name in the synonym field matching one or more of the individual terms from the search query using an SQL query; and retrieving the heading name from each heading field for each of the found heading records in the heading table.

49. A method according to claim 48, further comprising:

processing the found heading records prior to presenting the heading name from each heading field.

50. A method according to claim 49, the operation of processing the found heading records further comprising:

placing advertisements responsive to certain heading names in the heading field of the found heading records.

51. A method according to claim 49, the operation of processing the found heading records further comprising:

presenting an indication of subheading names responsive to certain heading names in the heading field of the found heading records.

52. A method according to claim 48, wherein the heading table is stored in a relational database.

53. A method according to claim 48, the operation of parsing the search query further comprising:

normalizing each individual term into a tokenized word form.

54. A method according to claim 48, wherein the on-line directory listing service is Web-based with the search query being accepted via a Web page and the heading names being retrieved onto a Web page.

\* \* \* \* \*